No. 626,073. J. M. MILLER. Patented May 30, 1899.
PIT HEATING FURNACE.
(Application filed Sept. 25, 1897.)
(No Model.) 2 Sheets—Sheet 1.
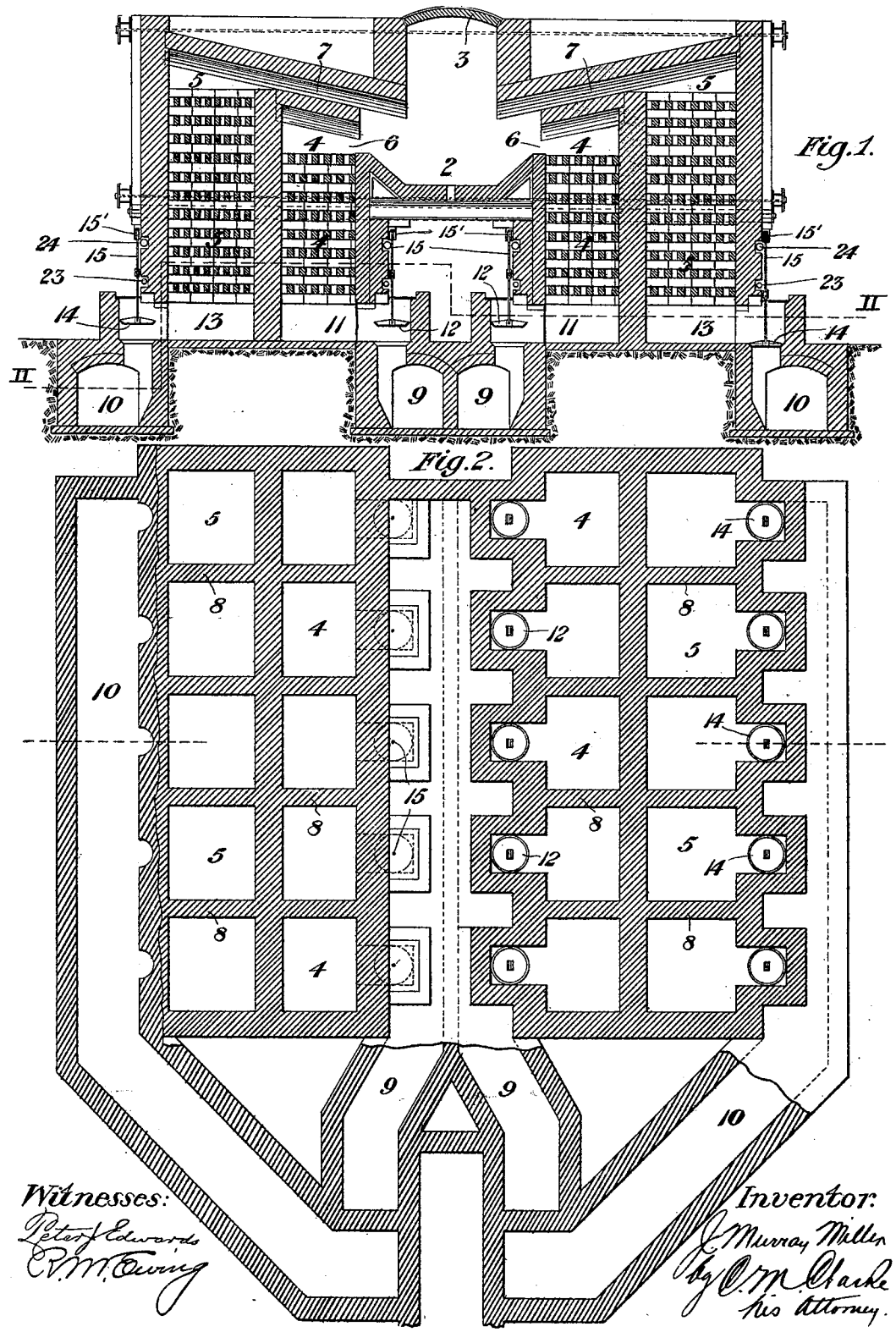

No. 626,073. Patented May 30, 1899.
J. M. MILLER.
PIT HEATING FURNACE.
(Application filed Sept. 25, 1897.)
(No Model.) 2 Sheets—Sheet 2.
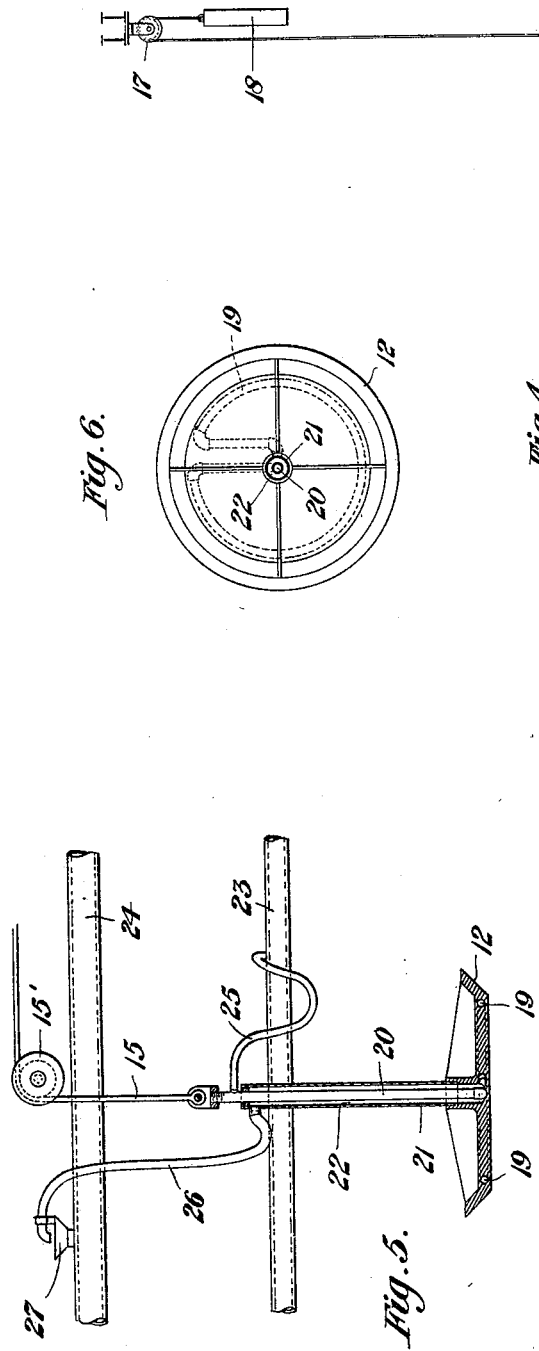
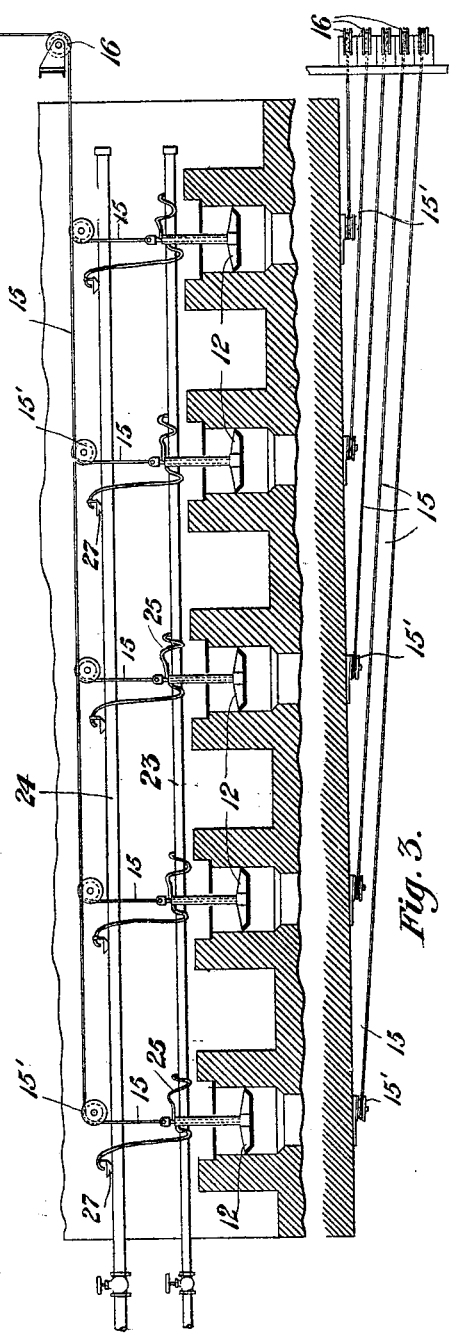
Witnesses:
Peter J. Edwards
F. M. Ewing
Inventor:
J. Murray Miller
by C. M. Clarke
his Attorney

UNITED STATES PATENT OFFICE.

JOHN MURRAY MILLER, OF BELLEVUE, PENNSYLVANIA.

PIT-HEATING FURNACE.

SPECIFICATION forming part of Letters Patent No. 626,073, dated May 30, 1899.

Application filed September 25, 1897. Serial No. 653,075. (No model.)

*To all whom it may concern:*

Be it known that I, JOHN MURRAY MILLER, a citizen of the United States, residing at Bellevue, in the county of Allegheny and State of Pennsylvania, have invented or discovered a new and useful Improvement in Pit-Heating Furnaces, of which the following is a full, clear, and exact description, reference being had to the accompanying drawings, forming part of this application, in which—

Figure 1 is a cross-sectional view through a furnace built in accordance with my invention. Fig. 2 is a sectional plan view indicated by the line II II of Fig. 1. Fig. 3 is a detail plan view of the valve-operating connections. Fig. 4 is a view thereof in elevation. Fig. 5 is a detail cross-sectional view illustrating the water-cooled valve. Fig. 6 is a plan view thereof.

My invention consists of an improvement in pit-heating or soaking-pit furnaces, and has for its object to cheapen the construction of such furnaces, to render the same more compact, to afford better facilities for cleaning and inspection, and to effect a more equal distribution of the gases of combustion and their control with relation to the soaking pit-compartments, and the furnace, air and gas passages and valves are designed so as to permit of easy regulation of the draft at any portion of the furnace.

It has been found in the design of regenerative soaking-pit furnaces commonly employed, wherein the gas is admitted at one end of the furnace structure and traverses across it to the other side, that the degree of heat and combustion of the gases is greatest at that end of the furnace at which the gas is admitted. In order to produce a more even temperature, I have found that by admitting the gas and air at intervals and by controlling such admission independently the flow and combustion of the gases may be very accurately controlled, resulting in greater efficiency and more regular action of the furnace.

Referring now to the drawings, 2 is the bed of the furnace, which in a pit-heating furnace preferably extends for the entire length of the structure, having the usual arched covers 3, and along each side are ranged the gas-regenerative chambers 4 4 and air-regenerative chambers 5 5, respectively, having flues 6 6 and 7 7 leading over into the furnace-chamber. These regenerative chambers are filled with the customary checker-work and are divided by cross partition-walls 8, whereby each separated section constitutes a regenerative chamber in itself irrespective of the adjoining section.

Extending side by side underneath the furnace 2 and below the level of the bottoms of the gas-heating chambers 4 are the gas conduits or flues 9, communicating with said gas-heating chambers by the lateral passages 11, downwardly turned into the gas-flues and so arranged as to form seats for the valves 12. The air conduits or flues 10 extend along the outside of the furnace on the same level as the gas-flues and communicate with the air-heating chambers 5 by passages 13, provided with valves 14.

By referring to Figs. 3 and 4 it will be seen that each valve is independently supported at the end of a cable 15, passing over sheaves 15', 16, and 17 and provided with a counterweight 18, just balancing the weight of the valve, so that it may be raised or lowered at pleasure to open or close wholly or partially the valve-opening. It is understood that suitable levers may be employed to operate the cables and valves and such use is contemplated, although I have not shown such means in the drawings. It will thus be seen that by proper manipulation of the valves the flame may be made to traverse all of the area of the furnace-chamber equally or only certain portions and that the gases may be easily and readily directed to such portion as it is desired to heat. By partially raising or lowering any of the valves the current may be checked, and generally the operation of the furnace is under perfect control.

For the purpose of keeping the valves cool a water-circulating pipe 19 is cast in the body of the valve, (see Fig. 5,) one end of which is connected to a central supply-pipe 20, and the other end is connected with an outer surrounding pipe 21, the intervening space 22 forming a return discharge-passage, the pipes serving also as a support by which the valve is suspended at the end of the cable. Along the side of the wall adjacent to each line of valves are located supply and waste pipes 23 24, and from the supply-pipe a branch flexible tube 25 connects to the top of the pipe 20, while a similar tube 26 is connected to the top of the outer pipe 21 and leads to a funnel 27, opening into the waste-pipe 24. By this means a water circulation is maintained through the valve, keeping it cool.

It will be understood that the valves at the opposite sides of the furnace are ordinarily operated in unison, although this is not absolutely necessary, and the structure may be designed and the valves so located as to control the circulation of the flame at any desired point across the bed of the furnace or to suit special conditions of use. Such and other changes may be made by the skilled furnace-builder without departing from my invention, and I desire to include within the scope of my invention all such changes as do not constitute a departure therefrom.

Having described my invention, what I claim is—

1. In a heating-furnace, the combination of a central heating-compartment, a series of two or more air-heating chambers and a series of two or more gas-heating chambers on each side of the central heating-compartment and communicating therewith, a gas flue or conduit extending longitudinally under the central heating-compartment and below the level of the bottoms of the gas-heating chambers, air flues or conduits extending longitudinally of and outside the air-heating chambers and below the levels of the bottoms thereof, series of flues provided with valve-seats leading upwardly from the air and gas conduits to the air and gas heating chambers respectively, and valves adapted to seat on said valve-seats, said valves and valve-seats being in an exposed position and readily accessible for inspection.

2. In a heating-furnace, the combination of a central heating-compartment, an air-heating chamber and a gas-heating chamber on each side of the central heating-compartment and communicating therewith, a gas flue or conduit extending longitudinally under the central heating-compartment and below the level of the bottoms of the gas-heating chambers, air flues or conduits extending longitudinally of and outside the air-heating chambers and below the level of the bottoms thereof, flues provided with valve-seats leading upwardly from the air and gas flues, valves adapted to seat on said valve-seats, and lateral flues leading from the vertical flues to the bases of the air and gas heating chambers respectively, said valves and valve-seats being in an exposed position and readily accessible for inspection.

In testimony whereof I have hereunto set my hand this 27th day of May, 1897.

J. MURRAY MILLER.

Witnesses:
PETER J. EDWARDS,
C. M. CLARKE.